(12) United States Patent
Iwabuchi et al.

(10) Patent No.: US 7,506,423 B2
(45) Date of Patent: Mar. 24, 2009

(54) MULTI-AXIS TURNING CENTER AND TURNING METHOD

(75) Inventors: Naoki Iwabuchi, Nara (JP); Masuhiro Iizuka, Nara (JP)

(73) Assignee: Mori Seiki Co., Ltd., Yamatokoriyama-Shi (JP)

( * ) Notice: Subject to any disclaimer, the term of this patent is extended or adjusted under 35 U.S.C. 154(b) by 737 days.

(21) Appl. No.: 11/152,174

(22) Filed: Jun. 15, 2005

(65) Prior Publication Data

US 2006/0283292 A1   Dec. 21, 2006

(51) Int. Cl.
*B23B 7/00* (2006.01)
*B23B 3/00* (2006.01)

(52) U.S. Cl. .............................. 29/27 C; 82/117; 82/122

(58) Field of Classification Search .................. 82/117, 82/122, 129, 131; 29/27 R, 27 C
See application file for complete search history.

(56) References Cited

U.S. PATENT DOCUMENTS

| | | | |
|---|---|---|---|
| 4,712,282 A | 12/1987 | Romeu | 29/27 |
| 6,073,323 A * | 6/2000 | Matsumoto | 29/27 C |
| 6,298,531 B1 | 10/2001 | Baumbusch et al. | 29/40 |
| 6,758,117 B2 * | 7/2004 | Baumann et al. | 82/117 |
| 6,928,909 B1 * | 8/2005 | Akimoto et al. | 82/129 |
| 2002/0170396 A1 | 11/2002 | Maier | 82/1.11 |
| 2003/0129024 A1 | 7/2003 | Hansson | 403/374.3 |

FOREIGN PATENT DOCUMENTS

| | | |
|---|---|---|
| DE | 1 868 910 U | 3/1963 |
| EP | 0 890 411 B1 | 1/1999 |
| JP | 11197915 A | 7/1999 |
| JP | 2002-79401 | 3/2002 |
| JP | 2002-154007 | 5/2002 |
| JP | 2004-160601 | 6/2004 |

OTHER PUBLICATIONS

German Office Action dated Jul. 30, 2007 w/English translation; and German Office Action dated May 2, 2008 w/English translation.

* cited by examiner

*Primary Examiner*—Willmon Fridie
(74) *Attorney, Agent, or Firm*—Kratz, Quintos & Hanson, LLP

(57) ABSTRACT

A multi-axis turning center has a spindle head, a spindle rotatably supported by the spindle head, and a table or a headstock for gripping and rotating a workpiece thereon. The table or the headstock is disposed in confronting relation to the spindle. The spindle head is relatively movable in the three mutually transverse axes directions to the workpiece gripped and rotated by the table or the headstock. A multi-point turning tool is mounted on the spindle and having a plurality of tips, for turning the workpiece gripped and supported by the table or the headstock. The spindle head is movable to translate the multi-point turning tool to one of positions around the workpiece, and the tips are selectively used depending on the one of the positions to turn the workpiece.

20 Claims, 8 Drawing Sheets

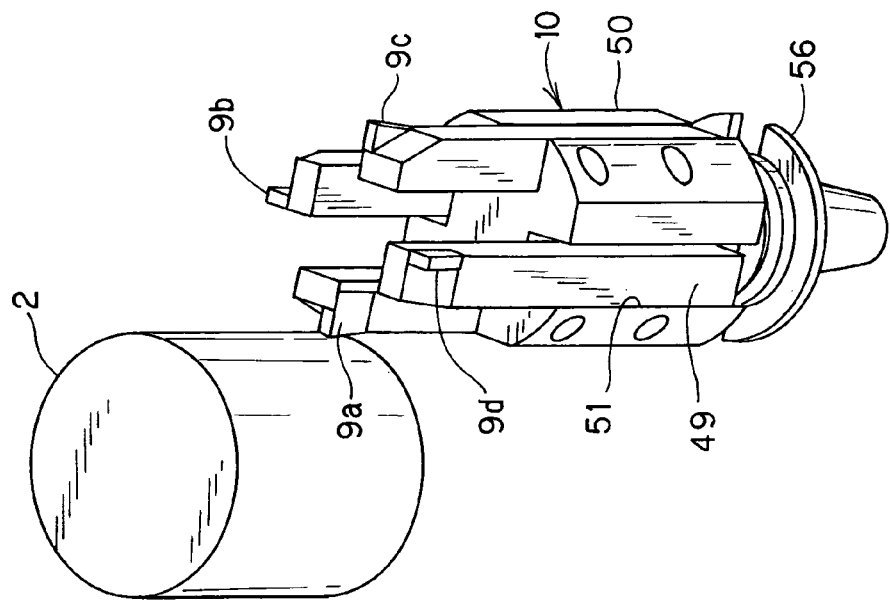
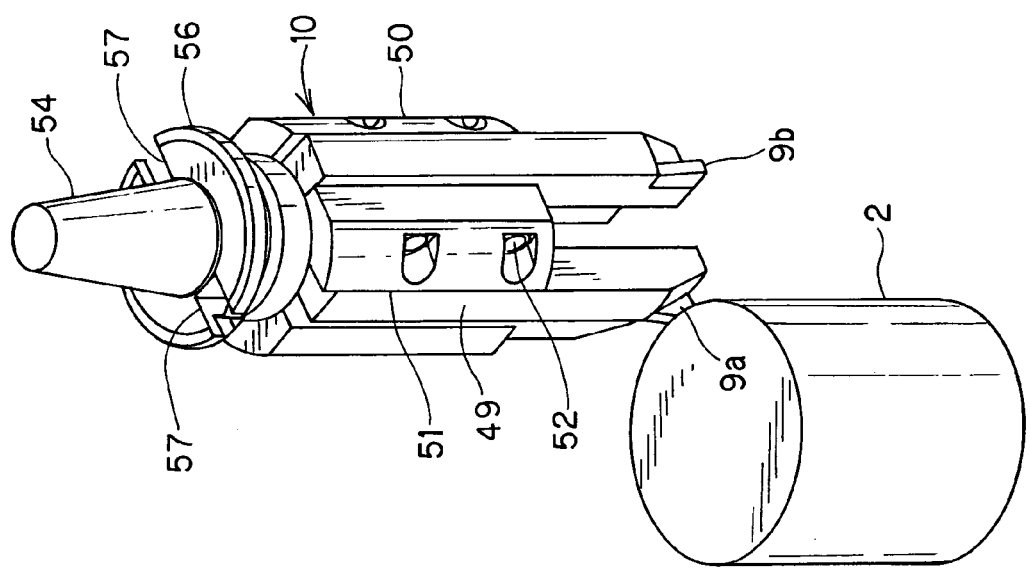
FIG. 5A
FIG. 5B

MULTI-AXIS TURNING CENTER AND TURNING METHOD

BACKGROUND OF THE INVENTION

1. Field of the Invention

The present invention relates to a multi-axis turning center for turning a workpiece with a multi-point turning tool, and a turning method for performing a turning process on a workpiece using such a multi-axis turning center.

2. Description of the Related Art

Japanese laid-open patent publication No. 2002-79401, for example, discloses a multi-axis turning center which is capable of performing a turning process on a workpiece with a multi-point turning tool having a plurality of inserts (tips) mounted thereon. The disclosed multi-axis turning center is a machine tool having a basic structure as a lathe, and has a multi-point tool mounted on a tool holder of a tool post.

Since the disclosed multi-axis turning center is essentially a lathe, the multi-point tool can swing with respect to the tool post. However, the multi-point tool is not movable over a stroke large enough to reach various positions around the workpiece which is supported on the multi-axis turning center.

For performing a turning process, a tool post controller energizes a tool drive motor to turn the multi-point tool about its own axis until a desired insert on the multi-point tool is indexed to the machining position. Then, the insert is securely positioned in place and is applied to machine the workpiece in the turning process.

As described above, the multi-axis turning center which basically has a lathe structure is required to perform an indexing control operation to turn the multi-point tool to index the desired insert. As a result, the overall machine tool needs to be controlled according to a complex control process.

For turning the multi-point tool to index the desired insert, the multi-point tool has to be electrically held in position for the turning process. Consequently, it is difficult to increase the rigidity with which the multi-point tool is supported in the turning process.

SUMMARY OF THE INVENTION

It is an object of the present invention to provide a multi-axis turning center which does not need to perform an indexing control process (C-axis control process) for swiveling a spindle with a multi-point turning tool mounted thereon to index a desired insert or tip and which is capable of increasing the rigidity with which the multi-point turning tool is supported in a turning process, and a turning method for performing a turning process on a workpiece using such a multi-axis turning center.

To achieve the above object, there is provided in accordance with the present invention a multi-axis turning center comprising: a spindle head; a spindle rotatably supported by the spindle head; a table or a headstock for gripping and rotating a workpiece thereon, the table or the headstock being disposed in confronting relation to the spindle, the spindle head being relatively movable in the three mutually transverse axes directions to the workpiece gripped and rotated by the table or the headstock; and a multi-point turning tool, mounted on the spindle and having a plurality of tips, for turning the workpiece gripped and supported by the table or the headstock; wherein the spindle head is movable to translate the multi-point turning tool to one of positions around the workpiece, and the tips are selectively used depending on the one of the positions to turn the workpiece.

Preferably, the multi-axis turning center further comprises: a fixture for positioning and fixing the multi-point turning tool to an end of the spindle head, the fixture comprising a key and a key slot for receiving the key therein.

Preferably, the tips are spaced at angular intervals circumferentially around a central axis of the multi-point turning tool and are regularly mounted on a tool holder of the multi-point turning tool.

Preferably, the multi-point turning tool comprises the tool holder and a plurality of bodies removably fixed to the tool holder, the tips being mounted on respective distal ends of the bodies.

Preferably, the tool holder has a plurality of grooves defined in a circumferential wall thereof and extending parallel to the central axis of the multi-point turning tool, the grooves being disposed at circumferentially equally spaced positions on the tool holder, the bodies being detachably fastened in the grooves, respectively, whereby the tips are positioned at equally spaced angular intervals around the tool holder about the central axis of the multi-point turning tool.

Preferably, the multi-axis turning center is capable of performing a turning process on the workpiece using the multi-point turning tool and a cutting process on the workpiece using a rotating tool, and the tool holder has a flange assembly and a shank on an end thereof remote from the tips, the flange assembly having a V-groove and a large-diameter flange, the large-diameter flange having an outside diameter greater than the outside diameter of a flange of the rotating tool.

Preferably, the flange assembly has at least one key slot, the spindle head having an end which supports a key removably engageable in the key slot, the key being fixed to the end and extending radially of the spindle head; wherein the key engages in the key slot of the large-diameter flange only when the multi-point turning tool is mounted on the spindle; wherein when the rotating tool is mounted on the spindle, the key is disposed in a position spaced from the flange of the rotating tool so as not to obstruct rotating motion of the rotating tool; and wherein the multi-point turning tool mounted on the spindle is nonrotatably positioned and fixed to the end of the spindle head by a fixture, the fixture comprising the key and the key slot.

Preferably, the multi-point turning tool is translated over large strokes in the directions of two axes to index the tips.

Preferably, each of the positions represents a range in which the multi-point turning tool is movable while the workpiece is being turned thereby.

The multi-point turning tool is translated to the positions fully around the workpiece or the positions in a partial range around the workpiece.

Preferably, the multi-axis turning center is a five-axis-controlled vertical machining center in which the spindle has an axis directed substantially perpendicularly to a floor on which the multi-axis turning center is installed, the table for gripping and positioning the workpiece so as to be directed upwardly is disposed below the vertical position of the spindle head, and the table is swingable and also is at least rotatable.

Preferably, the multi-axis turning center is capable of performing a turning process on the workpiece by using the multi-point turning tool and a cutting process on the workpiece by using a rotating tool.

Preferably, the multi-axis turning center is capable of performing the turning process and the cutting process successively on the workpiece automatically, wherein the workpiece is indexed vertically and horizontally and is also indexed obliquely as desired by a table swinging unit, accordingly, the multi-axis turning center performs a wide variety of turning and cutting processes on the workpiece.

According to the present invention, there is also provided a method of turning a workpiece with a multi-axis turning center having a spindle head, a spindle rotatably supported by the spindle head, a table or a headstock for gripping and rotating a workpiece thereon, the table or the headstock being disposed in confronting relation to the spindle, the spindle head being relatively movable in the three mutually transverse axes directions to the workpiece gripped and rotated by the table or the headstock, and a multi-point turning tool, mounted on the spindle and having a plurality of tips, for turning the workpiece gripped and supported by the table or the headstock, the method comprising the steps of moving the spindle head to translate the multi-point turning tool to one of positions around the workpiece, and turning the workpiece while the tips are selectively used depending on the one of the positions.

Preferably, in the turning method, the multi-point turning tool is positioned and fixed to an end of the spindle head by a fixture, the fixture comprising a key and a key slot for receiving the key therein.

Preferably, the turning method further comprises the steps of: when the multi-point turning tool is translated to one of the positions around the workpiece, keeping the multi-point turning tool nonrotatably positioned and fixed to the end of the spindle head by the fixture, and holding the coordinates of a central position of the workpiece unchanged; and determining the coordinates of the spindle when the multi-point turning tool is located in one of the positions with respect to the workpiece, thereby judging that one of the tips is selected, and controlling movement of the spindle head.

Preferably, in the turning method, the multi-axis turning center is a five-axis-controlled vertical machining center in which the spindle has an axis directed substantially perpendicularly to a floor on which the multi-axis turning center is installed, the table for gripping and positioning the workpiece so as to be directed upwardly is disposed below the vertical position of the spindle head, and the table is swingable and also is at least rotatable, and wherein the workpiece is turned by the five-axis-controlled vertical machining center.

With the multi-axis turning center and the turning method according to the present invention, it is not necessary to perform an indexing control process (C-axis control process) for swiveling a spindle with a multi-point turning tool mounted thereon to index a desired insert or tip, and the rigidity with which the multi-point turning tool is supported in a turning process is increased.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 5A is a perspective view showing the relationship between the multi-point turning tool and a workpiece;

FIG. 5B is a perspective view of the multi-point turning tool and the workpiece shown in FIG. 5A, as viewed upside down;

DESCRIPTION OF THE PREFERRED EMBODIMENTS

Figure 1:
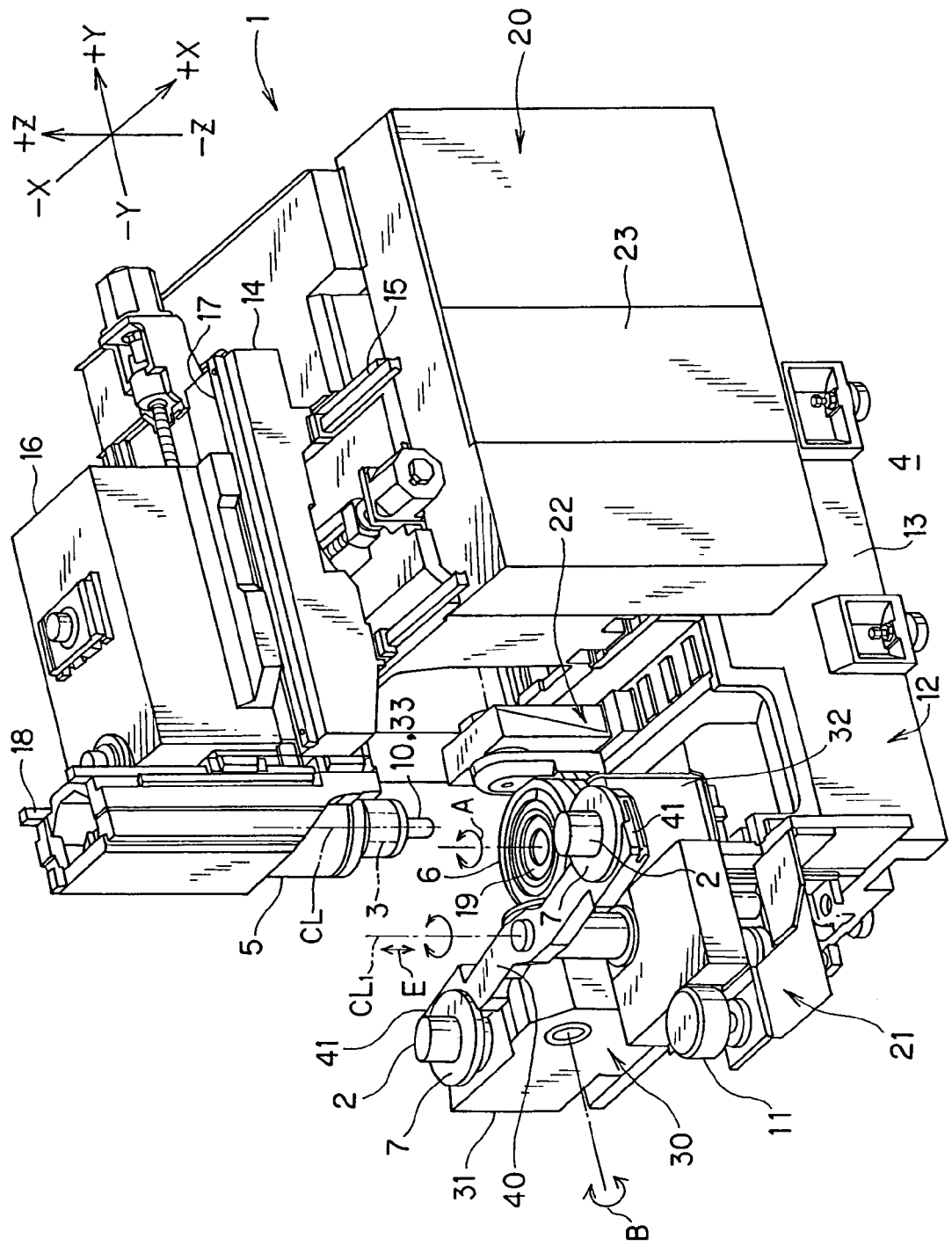
FIG. 1 is a perspective view of a multi-axis turning center having a basic structure as a machining center according to a first embodiment of the present invention.
Figure 2:
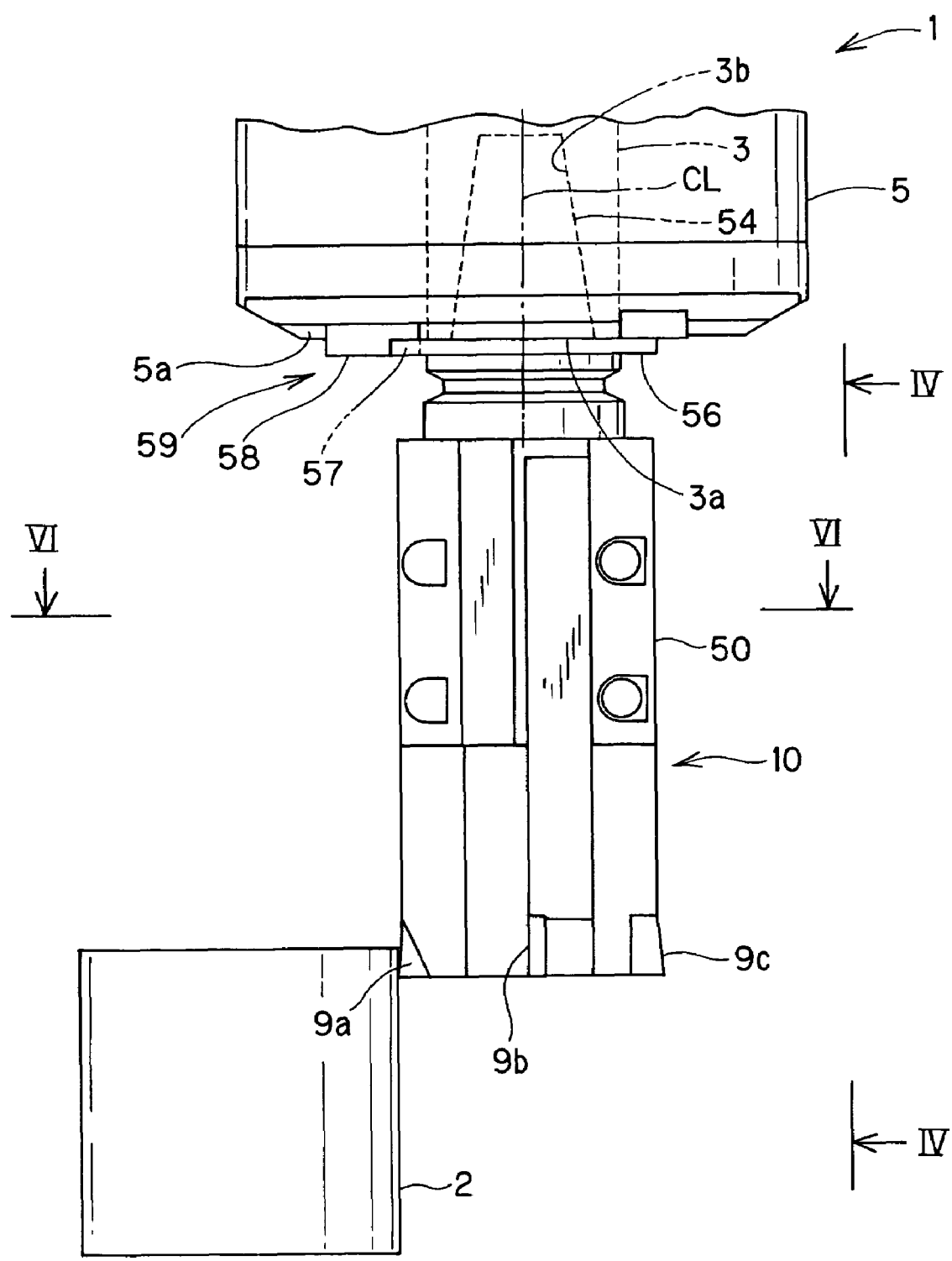
FIG. 2 is an enlarged fragmentary front elevational view of a multi-point turning tool on the multi-axis turning center shown in FIG. 1.
Figure 3:
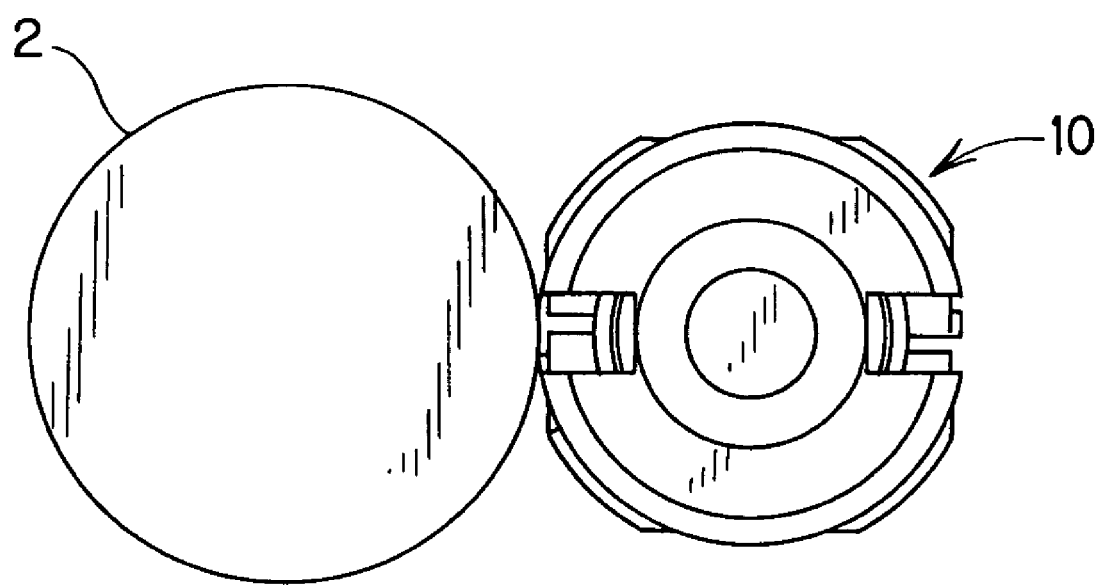
FIG. 3 is a plan view of the multi-point turning tool shown in FIG. 2.

In multi-axis turning centers according to the two embodiments of the present invention as described below, a spindle head is moved to translate a multi-point turning tool to a desired position around a workpiece to be machined and a plurality of tips on the multi-point turning tool are selectively used depending on the position which is reached by multi-point turning tool around the workpiece. It is not necessary to perform an indexing control process (C-axis control process) for indexing a desired tip, and the rigidity with which the multi-point turning tool is supported in a turning process is increased.

The multi-axis turning center according to the first embodiment is a machine tool having a basic structure as a machining center. In the multi-axis turning center, a spindle head by which a spindle is rotatably supported is relatively movable over large strokes to the workpiece in the three mutually transverse axes directions, and a table is disposed in confronting relation to the spindle.

The multi-axis turning center is capable of performing various machining processes including a turning process using a turning tool and a cutting process using a rotating tool. In the turning process, the workpiece gripped and rotated by the table is machined by the multi-point turning tool mounted on the spindle and having a plurality of tips mounted thereon.

According to the first embodiment, the multi-axis turning center is a five-axis-controlled vertical machining center having a swingable "cradle" table.

The multi-axis turning center according to the present invention may be any of various machine tools wherein a spindle head is relatively movable to the workpiece in the three mutually transverse axes directions, and a table is disposed in confronting relation to the spindle. For example, the multi-axis turning center may be a horizontal machining center or a vertical or horizontal turning center.

The multi-axis turning center according to the second embodiment may be a machine tool having a basic structure as a lathe and capable of performing at least a turning process on a workpiece. In the multi-axis turning center having a basic structure as a lathe, a spindle head, by which a spindle with a multi-point turning tool mounted thereon is rotatably supported, is relatively movable over large strokes to the workpiece in the three mutually transverse axes directions, and a headstock which grips the workpiece is disposed in confronting relation to the spindle of the spindle head.

The embodiments of the present invention will be described in detail below with reference to FIGS. 1 through 8. Like or corresponding parts are denoted by like or corresponding reference characters throughout views.

FIGS. 1 through 6 show a multi-axis turning center according to the first embodiment of the present invention. As shown in FIGS. 1 through 6, a multi-axis turning center 1 is a machine tool which has a basic structure as a vertical machining center and which is capable of performing at least a turning process on a workpiece 2.

The multi-axis turning center 1 is controlled by a control apparatus 20 comprising an NC (Numerical Control) device and a PLC (Programmable Logic Controller). The control apparatus 20 may be the NC device with a PLC incorporated therein.

The multi-axis turning center 1 has a spindle 3 having an axis CL directed substantially perpendicularly to a floor 4 on which the multi-axis turning center 1 is installed. The axis CL of the spindle may be inclined a certain angle to the vertical direction. The axis CL thus inclined shall also be referred to as being substantially perpendicular to the floor 4.

The spindle 3 is rotatably supported by a spindle head 5 which is relatively movable in the three mutually transverse axes directions (X-, Y- and Z-axes directions) to the workpiece 2 which is placed on a pallet 7. A table 6 for gripping the workpiece 2 through the pallet 7 is disposed below the spindle 3 in confronting relation thereto.

The multi-axis turning center 1 according to the first embodiment is a five-axis-controlled vertical machining center wherein the table 6 is a "cradle" table swingable about a B-axis parallel to the Y-axis.

In the multi-axis turning center 1, the Z-axis, which is a vertical axis in FIG. 1, extends parallel to the axis CL of the spindle 3, and the X- and Y-axes extend perpendicularly to the Z-axis, the X-, Y- and Z-axes making up an orthogonal coordinate system.

For illustrative purpose, the directions of −Y- and +Y-axes are referred to as forward and rearward directions, respectively, and the directions of +X- and −X-axes are referred to as rightward and leftward directions, respectively.

In the first embodiment, the spindle head 5 is illustrated as being movable in the three mutually transverse axes directions. However, the spindle head 5 may be movable in the directions of two orthogonal axes (e.g., X- and Y-axes), and the table 6 may be movable in the direction of one axis (e.g., Z-axis).

In the multi-axis turning center, the workpiece 2 gripped and rotated by the table 6 can be machined by a multi-point turning tool 10 mounted on the spindle 3 and having a plurality of (four in the illustrated embodiment) tips 9*a* through 9*d*. The tips 9*a* through 9*d* are spaced at angular intervals of 90° circumferentially around a central axis CL2 (see FIG. 6) of the multi-point turning tool 10 and are regularly mounted on a tool holder 50 of the multi-point turning tool 10.

The multi-point turning tool 10 is nonrotatably mounted on the spindle 3 for increased rigidity in a turning process.

When the spindle head 5 is moved over large strokes in the directions of the X- and Y-axes, the multi-point turning tool 10 is translated in these directions of the two axes. The multi-point turning tool 10 can thus be positioned in any of various positions, e.g., position S1, S2, S3 or S4 shown in FIG. 6, around the workpiece 2 placed on the table 6, and then the tips 9*a* through 9*d* on the multi-point turning tool 10 are selectively used depending on the position to machine the workpiece 2 in a turning process. Each of the positions S1, S2, S3 and S4 is not limited to a strict single point, but may also represent a certain range in which the multi-point turning tool 10 is movable in the turning process.

To index the tips 9*a* through 9*d* on the multi-point turning tool 10, it has been conventional practice to swivel the multi-point turning tool about its own axis. According to the present invention, the multi-point turning tool 10 is translated over large strokes in the directions of the X- and Y-axes to index the tips 9*a* through 9*d*.

Therefore, the multi-axis turning center 1 is not required to perform an indexing control process (C-axis control process) for swiveling the spindle 3 with the multi-point turning tool 10 mounted thereon to index the tips 9*a* through 9*d*.

The plural (four) chips 9*a* through 9*d* are mounted on the single multi-point turning tool 10. The chips 9*a* through 9*d* on the single multi-point turning tool 10 are selectively used to perform a plurality of turning processes, e.g., one or more turning processes at a plurality of times or a plurality of different types of turning processes, on the workpiece 2.

According to the first embodiment, the multi-point turning tool 10 can be translated fully around the workpiece 2. However, the multi-point turning tool 10 may be translated to positions in a partial range, rather than a full range, around the workpiece 2.

The workpiece 2 is gripped by the table 6 through the pallet 7. According to a modification, the pallet 7 may be dispensed with, and the workpiece 2 may be removably gripped by a chuck on the table 6.

The multi-axis turning center 1 has an automatic pallet changer (hereinafter referred to as "APC") 21 (see FIG. 1) as a pallet changing device for changing pallets 7. The APC 21 is disposed in the vicinity of a machining area 22 and is controlled by the control apparatus 20. A pallet setup base 11 for placing a pallet 7 thereon is disposed outside of the machining area 22.

The APC 21 supplies an unmachined workpiece 2 placed on a pallet 7 from the pallet setup base 11 to the table 6. On the table 6, the workpiece 2 is turned by the multi-point turning tool 10 or is cut by a rotating tool 33. After the workpiece 2 is machined, the pallet 7 with the machined workpiece 2 placed thereon is returned from the table 6 to the pallet setup base 11 by the APC 21.

The APC 21 has the pallet setup base 11 and a pallet changing arm 40 (hereinafter referred to as "arm 40"). The arm 40 can be swiveled in a substantially horizontal plane about an axis CL1, and can be vertically moved along the axis CL1 (see arrow E). The axis CL1 extends vertically parallel to the Z-axis.

The arm 40 has at least one pallet grip 41 (a pair of pallet grips 41 in the illustrated embodiment) for gripping and releasing a pallet 7. The arm 40 is swiveled and is vertically moved to move the pallet 7 between the table 6 and the pallet setup base 11 and also to transfer the pallet 7 to the table 6 and the pallet setup base 11.

The arm 40 can be swiveled and vertically moved only, and cannot be reciprocally moved linearly in horizontal directions. Therefore, the arm 40 is capable of changing the pallet 7 in a short period of time, and the APC 21 is simple and compact in structure.

The pallet changing device may not comprise the APC 21, but may be arranged to allow the arm 40 to be swiveled and vertically moved manually.

The multi-axis turning center 1 has a bed 13 serving as a base 12. The base 12 supports thereon a saddle 14 movably mounted on X-axis guide rails 15 for movement in the directions of the X-axis, i.e., the leftward and rightward directions.

A column 16 is movably mounted on Y-axis guide rails 17 on the saddle 14 for movement in the directions of the Y-axis, i.e., the forward and rearward directions. The spindle head 5 is mounted on a front end of the column 16.

The spindle head 5 is movably mounted on Z-axis guide rails 18 on the column 16 for movement in the directions of the Z-axis, i.e., the upward and downward directions. The spindle 3 is rotatably supported on the spindle head 5.

The table 6 is supported on the bed 13 and is disposed below the vertical position of the spindle head 5. The table 6 is actuated by a table actuator 30 to swing about the B-axis and also at least to rotate about an A-axis which is a rotating central axis of the table 6. The illustrated table 6 is capable of both rotating and indexing about the A-axis.

The pallet 7 can removably be supported on the table 6 and can be positioned upwardly in the direction of the Z-axis by the table 6. The workpiece 2 is removably fixed to the pallet 7 by a fixture thereon.

The table 6 has a clamping and unclamping mechanism 19 for clamping and unclamping the pallet 7. The pallet 7 which is mounted on the table 6 is clamped on the table 6 by the clamping and unclamping mechanism 19. The table 6 has an actuator (not shown) for actuating the clamping and unclamping mechanism 19 to clamp and unclamp the pallet 7.

The table actuator 30 has a table swinging unit 31 and a table indexing unit 32. The table swinging unit 31 swings the table 6 about the B-axis. The table indexing unit 32 indexes the pallet 7 about the A-axis with respect to the table 6, and also rotates the pallet 7 about the A-axis with respect to the table 6.

The table swinging unit 31 is positioned in a front region of the multi-axis turning center 1, and supports diametrically opposite ends of the table 6 so as to be swingable about the B-axis. When the table swinging unit 31 is actuated, the table 6 and the table indexing unit 32 which is combined with the table 6 are swung about the B-axis and are indexed at a given position.

When the table indexing unit 32 is actuated in the turning process, the pallet 7 and the workpiece 2 which are supported on the table 6 are rotated about the A-axis at a predetermined speed. The workpiece 2 on the pallet 7 is now turned by one of the tips 9a through 9d on the multi-point turning tool 10 mounted on the spindle 3.

The rotating tool 33 may be mounted on the spindle 3 for cutting the workpiece 2 in a cutting process. In the cutting process, the table indexing unit 32 is controlled to index the workpiece 2 on the pallet 7 about the A-axis to a certain angular position. After the workpiece 2 has been indexed, the workpiece 2 is cut by the rotating tool 33 on the spindle 3.

The machining area 22 is covered with a splash guard (not shown) to prevent the coolant and chips from being scattered around the machining area 22. The splash guard has a shutter which is openable and closable for changing the workpiece 2 and a shutter which is openable and closable for changing the tool. The workpiece 2 and the tools 10, 33 can be changed through the openings in the splash guard which are provided when the shutters are opened.

The base 12 has an automatic tool changer (not shown, hereinafter after referred to as "ATC") for storing a plurality of tools and for changing the tools. The ATC is capable of indexing the tool 10, 33 (or an idle tool holder) to a predetermined tool changing position, and of automatically changing the tool 10, 33.

The ATC stores turning tools, e.g., the multi-point turning tool 10, for turning the workpiece 2 and also the rotating tools 33 for cutting the workpiece 2. Alternatively, a plurality of tools 10, 33 may be stored in a tool magazine separate from the ATC.

The control apparatus 20 has a control console 23. The control console 23 has a display unit such as a LCD, a CRT, or the like and an input unit such as a keyboard, a touch panel, or the like. The control console 23 allows the operator to control the multi-axis turning center 1, the APC 21 and the ATC.

A coolant tank (not shown) for storing a cutting fluid to be supplied to the machining position is disposed in the vicinity of the bed 13.

The spindle head 5 is relatively movable in the three mutually transverse axes directions to the workpiece 2 supported on the pallet 7 on the table 6. The table 6 can be swung, indexed and rotated by the table actuator 30.

Therefore, the multi-axis turning center 1 is capable of machining the workpiece 2 under five-axis control for the X-axis, the Y-axis, the Z-axis, the A-axis and the B-axis. The multi-axis turning center 1 can turn the workpiece 2 with a turning tool, e.g., the multi-point turning tool 10 and can cut the workpiece 2 with the rotating tool 33.

The multi-axis turning center 1 is capable of machining a wide variety of types of workpieces in various machining processes. The multi-axis turning center 1 can thus perform a function as a multi-axis machine tool.

In the illustrated embodiment, the multi-point turning tool 10 is of an assembled structure with the tips 9a through 9d. However, the multi-point turning tool 10 may not be of an assembled structure. In the illustrated embodiment, the single multi-point turning tool 10 has the four tips 9a through 9d. However, the single multi-point turning tool 10 may have a plurality of (preferably an even number of) tips, e.g., two tips, six tips or eight tips.

The multi-point turning tool 10 has a cylindrical tool holder 50 and a plurality of (four in the illustrated embodiment) bodies 49 detachably mounted on the tool holder 50. The tips 9a through 9d are secured to the respective distal ends of the bodies 49 by brazing, welding, or the like, or are removably fastened to the respective distal ends of the bodies 49 by fasteners such as screws or the like.

The tool holder 50 has a plurality of (four in the illustrated embodiment) grooves 51 defined in a circumferential wall thereof at circumferentially spaced positions and extending parallel to the axis CL2. The grooves 51 are open radially outwardly and angularly spaced at equal intervals of 90° around the tool holder 50.

The bodies 49 engage in the respective grooves 51 and are removably fastened to the tool holder 50 by screws 52. The tips 9a through 9d are thus positioned at equally spaced angular intervals of 90° around the tool holder 50 about the axis CL2.

The tool holder 50 has a flange assembly 53 and a shank 54 on its end remote from the tips 9a through 9d. Though a main part, the flange assembly 53 and the shank 54 of the tool holder 50 are of a unitary structure in the illustrated embodiment, they may be separate from each other.

The flange assembly 53 has an annular V-groove 55 and a large-diameter flange 56. The gripper of the tool changing arm of the ATC removably engages in the annular V-groove 55 for changing the multi-point turning tool 10.

The large-diameter flange 56 has an outside diameter greater than an outside diameter of a flange of the rotating tool 33. The flange assembly 53 has one or more (a pair of in the illustrated embodiment) key slots 57 defined in the large-diameter flange 56. The key slots 57 are positioned in diametrically opposite relation to each other across the axis CL2, and are oriented radially.

The spindle head 5 has a lower end 5a (see FIG. 2) to which there is fixed a key 58 extending radially of the spindle head 5 for removably engaging in the key slots 57. The key 58 engages in the key slot 57 only when the multi-point turning tool 10 is mounted on the spindle 3.

The key 58 is disposed in a position spaced from the flange of the rotating tool 33 as mounted on the spindle 3. Therefore, when the rotating tool 33 is mounted on the spindle 3, the key 58 does not present an obstacle to the rotating motion of the rotating tool 33.

The multi-point turning tool 10 mounted on the spindle 3 is nonrotatably positioned and fixed to the end 5a of the spindle head 5 by a fixture 59 which is made up of the key 58 and the key slots 57. Therefore, the rigidity of the multi-point turning tool 10 in the turning process is high.

According to a modification, the fixture 59 may comprise a key fixed to the multi-point turning tool 10 and a key slot defined in the end 5a of the spindle head 5 for receiving the key therein.

The shank 54 of the multi-point turning tool 10 is detachably mounted in a socket 3b defined in the end 3a of the spindle 3. The shank 54 can be clamped on and unclamped from the spindle 3 by a clamping and unclamping mechanism (not shown).

A turning process for turning the workpiece 2 with a selected one of the tips 9a through 9d of the multi-point turning tool 10 will be described below.

Prior to the turning process, the APC 21 is actuated to place the pallet 7 on the table 6. The pallet 7 supports an unmachined workpiece 2 fixedly thereon. The pallet 7 is clamped on the table 6 by the clamping and unclamping mechanism 19.

The table swinging unit 31 is actuated to swing the table 6 thereby to direct the pallet 7 upwardly for keeping the A-axis, of the workpiece 2 on the table 6, parallel to the axis CL of the spindle 3, i.e., the Z-axis.

For machining the workpiece 2 obliquely, the table 6 is angularly positioned to keep the A-axis, of the workpiece 2 on the table 6, oblique to the axis CL of the spindle 3.

The multi-point turning tool 10 is mounted on the spindle 3 by a tool changing action of the ATC. The shank 54 of the multi-point turning tool 10 is mounted in the socket 3b in the spindle 3 and is clamped therein by the clamping and unclamping mechanism.

The large-diameter flange 56 of the multi-point turning tool 10 is held in close contact with the end 3a of the spindle 3. The key 58 fixed to the spindle head 5 engages in the key slots 57 in the large-diameter flange 56. The multi-point turning tool 10 is therefore fixedly positioned on the end 5a of the spindle head 5 by the fixture 59.

Heretofore, it has been general practice to electrically position and fix the turning tool according to an electric indexing control process (C-axis control process), and to machine a workpiece with the turning tool thus positioned. According to the present invention, however, the multi-point turning tool 10 is mechanically positioned and fixed to the end 5a of the spindle head 5 by the fixture 59. Consequently, the rigidity of the multi-point turning tool 10 in the turning process is higher than heretofore.

The unmachined workpiece 2 on the pallet 7 fixed to the table 6 is turned as follows: The table indexing unit 32 is actuated to rotate the pallet 7 and the workpiece 2 on the table 6 at a predetermined speed.

Then, the spindle head 5 is moved in the directions of two orthogonal axes, i.e., the X- and Z-axes or the Y- and Z-axes. The workpiece 2 on the pallet 7 can now be turned by the multi-point turning tool 10 mounted on the spindle 3.

Specifically, the spindle head 5 is moved to translate the multi-point turning tool 10 to a desired position, e.g., the position S1, S2, S3 or S4, around the workpiece 2. Depending on the position to which the multi-point turning tool 10 is translated, the tips 9a through 9d on the multi-point turning tool 10 are selectively used to turn the workpiece 2.

More specifically, the multi-point turning tool 10 is translated to the desired position S1, S2, S3 or S4 around the workpiece 2. The multi-point turning tool 10 is fixedly positioned nonrotatably on the end 5a of the spindle head 5 by the fixture 59. The workpiece 2 has a central position O1 (see FIG. 6) of which coordinates remain unchanged.

When the multi-point turning tool 10 is located in the position S1, for example, with respect to the workpiece 2, the coordinates of the spindle 3 are determined to judge that the tip 9a is selected at present, and the movement of the spindle head 5 is controlled.

Similarly, when the multi-point turning tool 10 is located in the position S2 with respect to the workpiece 2, the coordinates of the spindle 3 are determined to judge that the tip 9b is selected at present, and the movement of the spindle head 5 is controlled. The movement of the spindle head 5 is also controlled in the same manner when the tips 9c, 9d are selected.

The movement of the spindle head 5 is controlled in the same manner for a multi-axis turning center 101 (see FIG. 7) according to the second embodiment to be described later.

Since the multi-axis turning center 1 is a machine tool having a basic structure as a machining center, the spindle head 5 can be relatively moved to the workpiece 2 in the three mutually transverse axes directions. The multi-point turning tool 10 can be brought into a desired one of the positions S1, S2, S3 and S4 around the workpiece 2, and the tips 9a through 9d are selectively used depending on that desired position to turn the workpiece 2.

For example, if the left tip 9a of the multi-point turning tool 10 is to be used, then the multi-point turning tool 10 is brought into the position S1 which is located rightward of the workpiece 2, directing the tip 9a toward the workpiece 2.

When the left tip 9a is worn out or a different turning process is to be performed, the front tip 9b of the multi-point turning tool 10 may be used. At this time, the spindle head 5 is moved in the directions of two orthogonal axes, i.e., the X- and Y-axes, to translate the multi-point turning tool 10 into the position S2 which is located rearward of the workpiece 2, directing the front tip 9b toward the workpiece 2.

Similarly, if the right tip 9c of the multi-point turning tool 10 is to be used, then the spindle head 5 is moved in the directions of two orthogonal axes, i.e., the X- and Y-axes, to translate the multi-point turning tool 10 into the position S3 which is located leftward of the workpiece 2, directing the right tip 9c toward the workpiece 2.

If the rear tip 9d of the multi-point turning tool 10 is to be used, then the spindle head 5 is moved in the directions of two orthogonal axes, i.e., the X- and Y-axes, to translate the multi-point turning tool 10 into the position S4 which is located forward of the workpiece 2, directing the rear tip 9d toward the workpiece 2.

Then, the spindle head 5 is controlled for movement in the directions of two orthogonal axes, i.e., the X- and Z-axes or the Y- and Z-axes. The workpiece 2 can now be turned by the tip 9a, 9b, 9c or 9d.

The unmachined workpiece 2 on the pallet 7 fixed to the table 6 is cut as follows: The table indexing unit 32 is actuated to index the workpiece 2 on the table 6 to a predetermined angular position.

The rotating tool 33 mounted on the spindle 3 is rotated at a predetermined speed. The spindle head 5 is relatively moved in the three mutually transverse axes directions to the workpiece 2 fixed to the pallet 7 on the table 6, and the rotating tool 33 cuts the workpiece 2.

If the workpiece 2 is to be turned by another turning tool or to be cut by another rotating tool, then the tools are changed between the spindle 3 and the ATC, and afterward the workpiece 2 is machined again.

When the turning or cutting process on the workpiece 2 is finished, the machined workpiece 2 is changed for an unmachined workpiece 2 by the APC 21, and then the unmachined workpiece 2 is machined.

The above sequence is repeated to turn and cut the workpiece 2. Therefore, the workpiece 2 can successively be turned and cut automatically.

The workpiece 2 can be indexed vertically and horizontally, and can also be indexed obliquely as desired by the table swinging unit 31. Accordingly, the multi-axis turning center 1 can perform a wide variety of turning and cutting processes on the workpiece 2.

Figure 6:
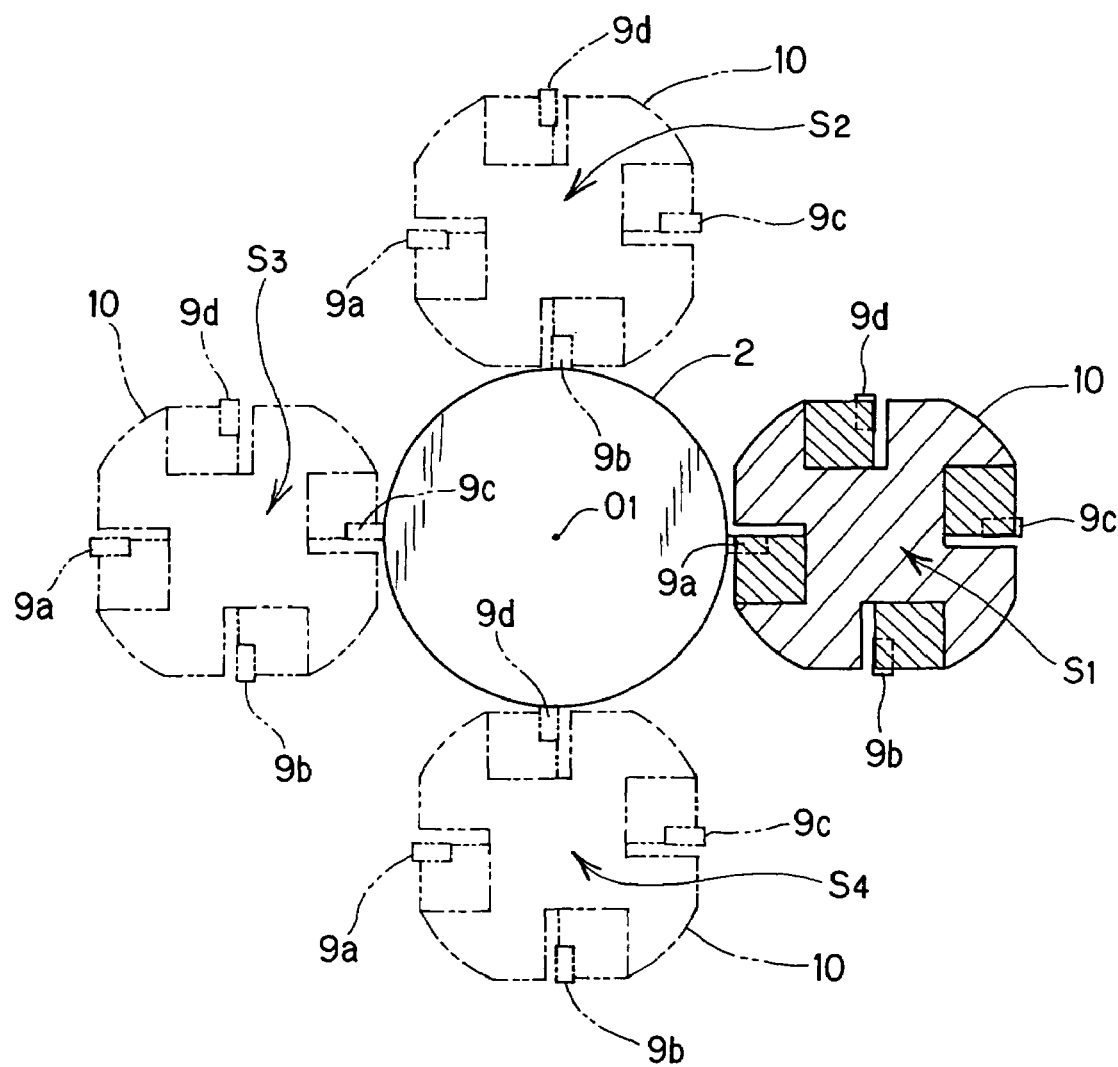
FIG. 6 is a cross-sectional view taken along line VI-VI of FIG. 2, showing a turning process performed by the multi-axis turning center.
Figure 7:
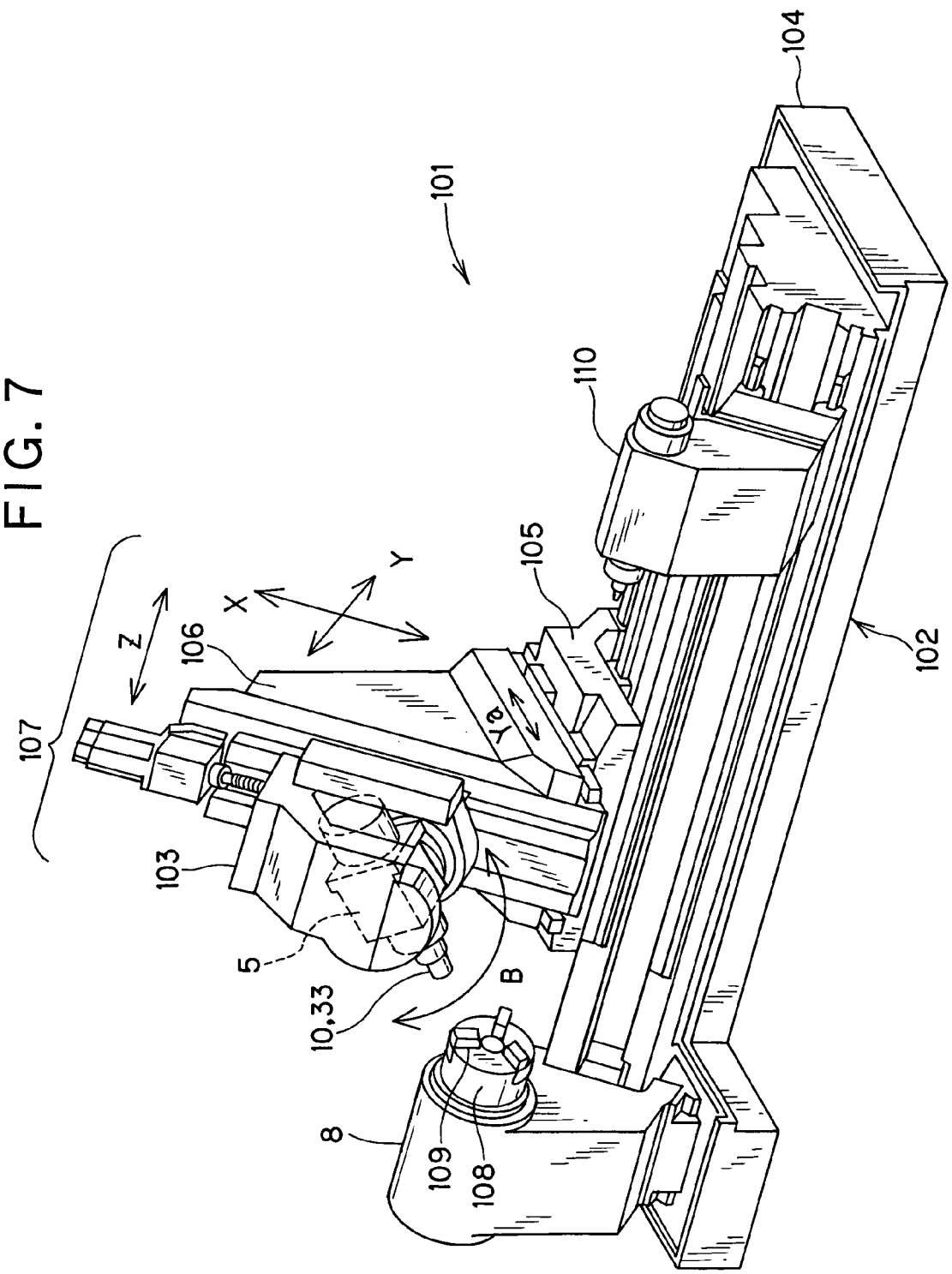
FIG. 7 is a perspective view of a multi-axis turning center having a basic structure as a lathe according to a second embodiment of the present invention.
Figure 8:
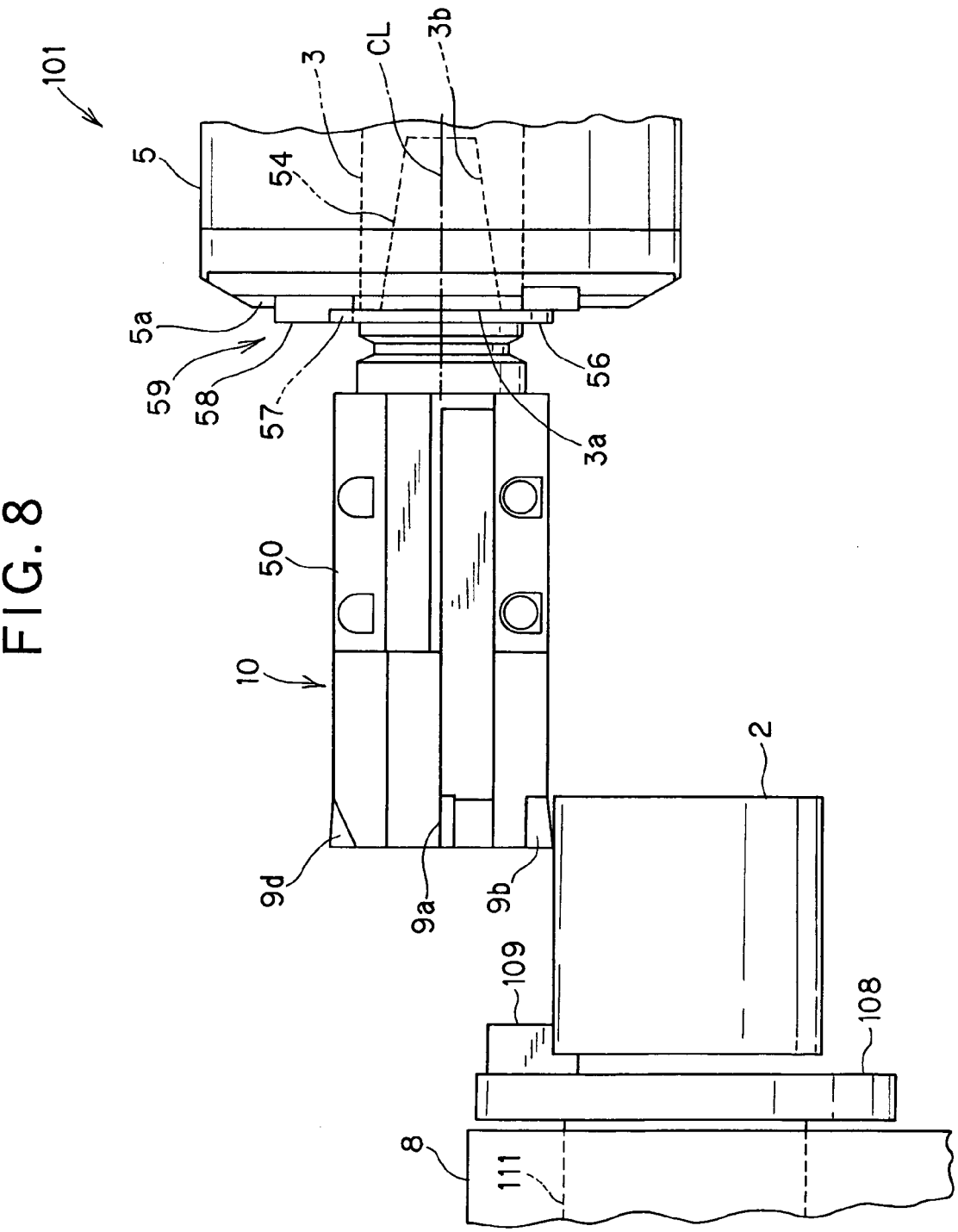
FIG. 8 is an enlarged fragmentary front elevational view of a multi-point turning tool on the multi-axis turning center shown in FIG. 7.

FIGS. 7 and 8 show a multi-axis turning center according to the second embodiment of the present invention. Those parts of the multi-axis turning center shown in FIGS. 7 and 8 which are identical to those of the multi-axis turning center shown in FIGS. 1 through 6 are denoted by identical reference characters, and will not be described in detail below. Only parts of the multi-axis turning center shown in FIGS. 7 and 8 which are different from those of the multi-axis turning center shown in FIGS. 1 through 6 will be described below.

As shown in FIGS. 7 and 8, a multi-axis turning center 101 is a machine tool which has a basic structure as a lathe and which is capable of performing at least a turning process on a workpiece 2. The multi-axis turning center 101 has a base 102, a headstock 8 for gripping the workpiece 2, and a tool rest 103. The tool rest 103 has a spindle head 5 for mounting a multi-point turning tool 10 or a rotating tool 33 thereon.

The base 102 comprises a bed 104, a saddle 105 and a column 106. The saddle 105 is supported on the bed 104 and is movable in the direction of a Z-axis. The column 106 is supported on the saddle 105 and is movable in the direction of a Ya-axis which is perpendicular to the Z-axis and which extends horizontally in forward and rearward directions. The tool rest 103 is supported on the column 106 for movement in the direction of an X-axis. The saddle 105, the column 106 and the tool rest 103 jointly make up a movable assembly 107 which is movable in the direction of the Z-axis. A tailstock 110 movable in the direction of the Z-axis is mounted on the bed 104.

The movement of the column 106 with respect to the saddle 105 in the direction of the Ya-axis and the movement of the tool rest 103 with respect to the column 106 in the direction of the X-axis can be combined to allow the tool rest 103 to move in the direction of a Y-axis.

A workpiece spindle 111 is rotatably supported in the headstock 8. A chuck 108 having a plurality of (three in the illustrated embodiment) jaws 109 is mounted on the end of the workpiece spindle 111 which projects from the headstock 8. The jaws 109 are closed and opened to grip and release the workpiece 2. When the workpiece spindle 111 is rotated about its own axis, the workpiece 2 gripped by the jaws 109 is also rotated.

The multi-axis turning center 101 is capable of performing various machining processes including a turning process using the multi-point turning tool 10 and a cutting process using the rotating tool 33. The multi-axis turning center 101 can successively turn and cut the workpiece 2 automatically.

The multi-point turning tool 10 is mounted on a spindle 3 which is rotatably supported in the spindle head 5. The spindle head 5 is relatively movable over large strokes in the three mutually transverse axes directions (X-, Y- and Z-axes directions) to the workpiece 2 mounted on the workpiece spindle 111. The spindle head 5 is swingable about a B-axis.

For performing a turning process on the workpiece 2 with the multi-point turning tool 10, the spindle head 5 is directed parallel to the headstock 8 which is gripping the workpiece 2. The headstock 8 is thus disposed in confronting relation to the spindle 3 supported by the spindle head 5. The workpiece 2, which is gripped and rotated by the chuck 108 on the headstock 8, can be turned by the multi-point turning tool 10 which is mounted on the spindle 3 and which has a plurality of tips 9a through 9d.

Specifically, the spindle head 5 is moved to translate the multi-point turning tool 10 to a desired position, e.g., the position S1 or S2 shown in FIG. 6, around the workpiece 2. Therefore, the tips, e.g., the tips 9a, 9b, of the multi-point turning tool 10 are selectively used to turn the workpiece 2. According to the second embodiment, the multi-point turning tool 10 is translated to positions (e.g., the positions S1, S2) in a partial range, rather than a full range, around the workpiece 2.

Figure 4:
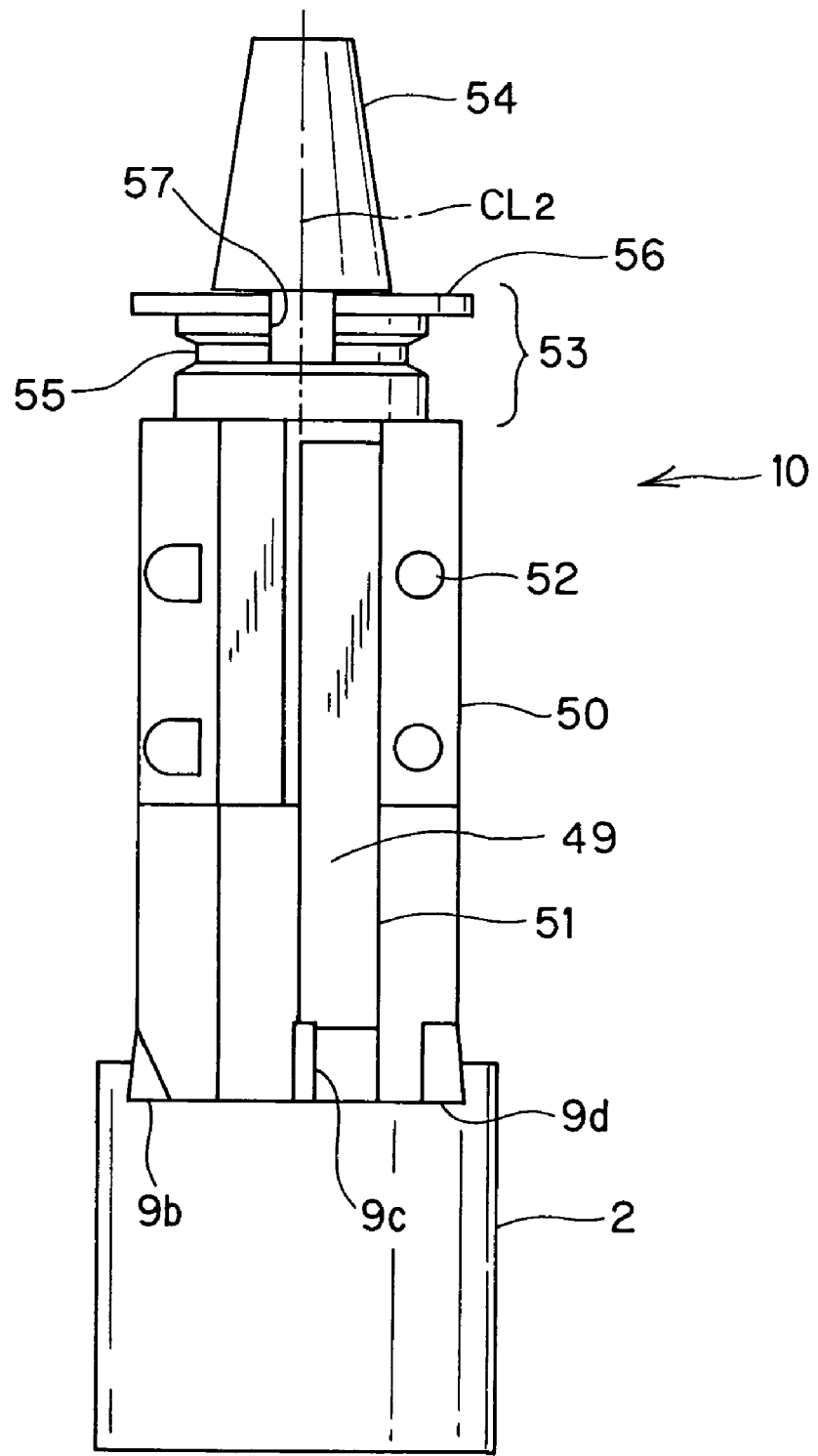
FIG. 4 is a side elevational view taken along line IV-IV of FIG. 2.

Structural details of the multi-point turning tool 10 and the fixture 59 and details of the process of turning the workpiece 2 with the multi-point turning tool 10 according to the second embodiment are identical to those of the first embodiment. The details shown in FIGS. 4 through 6 are also applicable to the second embodiment.

With the multi-axis turning center 1 (or the multi-axis turning center 101) and the turning method according to the present invention, the spindle head 5 is moved to translate the multi-point turning tool 10. As a result, the multi-point turning tool 10 is brought into a desired one of the positions S1 through S4 around the workpiece 2, whereby the tips 9a through 9d are selectively used.

Consequently, it is not necessary to perform an indexing control process (C-axis control process) for swiveling the spindle 3 to index the tips 9a through 9d. The tips 9a through 9d of the multi-point turning tool 10 can selectively be used simply by moving the spindle head 5 in the directions of two axes, i.e., the X- and Y-axes, thereby to translate and position the multi-point turning tool 10. Therefore, the multi-axis turning center 1, 101 can be controlled in its entirety with ease.

Heretofore, the tool spindle may be subject to C-axis control for indexing the tips of the turning tool. It has been found that the speed for positioning the multi-point turning tool 10 to a desired one of the positions S1 through S4 according to the present invention is slightly greater than the conventional indexing speed.

Since the multi-point turning tool 10 is forcibly positioned and fixed to the end 5a of the spindle head 5 by the fixture 59, the rigidity of the multi-point turning tool 10 in the turning process is increased. Accordingly, the multi-point turning tool 10 can turn the workpiece 2 stably and highly accurately within a shortened period of time. The multi-point turning tool 10 can turn the workpiece 2 even if the workpiece 2 is relatively hard.

The principles of the present invention are applicable to any multi-axis turning centers, which are capable of turning a workpiece with a multi-point turning tool, including a vertical machining center, a horizontal machining center, a turning center and a lathe, etc.

Although certain preferred embodiments of the present invention have been shown and described in detail, it should be understood that various changes and modifications may be made therein without departing from the scope of the appended claims.

What is claimed is:

1. A multi-axis turning center comprising:
   a spindle head;
   a spindle supported by said spindle head;

a table or a headstock to grip and rotate a workpiece thereon, said table or said headstock being disposed in confronting relation to said spindle, said spindle head being relatively translatable in the three mutually transverse directions relative to said workpiece gripped and rotated by said table or said headstock; and a multi-point turning tool, mounted on said spindle and having a plurality of tips, to turn said workpiece gripped and supported by said table or said headstock;

wherein said spindle head is movable to translate said multi-point turning tool to one of plural positions around said workpiece, said tips are selectively used depending on said one of the positions to turn said workpiece, and said spindle head is not rotated between the plural positions or when turning said workpiece with said tips.

2. A multi-axis turning center according to claim 1, further comprising:

a fixture for positioning and fixing said multi-point turning tool to an end of said spindle head, said fixture comprising a key and a key slot for receiving said key therein.

3. A multi-axis turning center according to claim 1, wherein said tips are spaced at angular intervals circumferentially around a central axis of said multi-point turning tool and are regularly mounted on a tool holder of said multi-point turning tool.

4. A multi-axis turning center comprising:

a spindle head;

a spindle rotatably supported by said spindle head;

a table or a headstock for gripping and rotating a workpiece thereon, said table or said headstock being disposed in confronting relation to said spindle, said spindle head being relatively movable in the three mutually transverse axes directions to said workpiece gripped and rotated by said table or said headstock; and a multi-point turning tool, mounted on said spindle and having a plurality of tips, for turning said workpiece gripped and supported by said table or said headstock;

wherein said spindle head is movable to translate said multi-point turning tool to one of positions around said workpiece, and said tips are selectively used depending on said one of the positions to turn said workpiece;

wherein said multi-point turning tool comprises said tool holder and a plurality of bodies removably fixed to said tool holder, said tips being mounted on respective distal ends of said bodies.

5. A multi-axis turning center according to claim 4, wherein said tool holder has a plurality of grooves defined in a circumferential wall thereof and extending parallel to said central axis of said multi-point turning tool, said grooves being disposed at circumferentially equally spaced positions on said tool holder, said bodies being detachably fastened in said grooves, respectively, whereby said tips are positioned at equally spaced angular intervals around said tool holder about said central axis of said multi-point turning tool.

6. A multi-axis turning center according to claim 3, wherein said multi-axis turning center is capable of performing a turning process on the workpiece using said multi-point turning tool and a cutting process on the workpiece using a rotating tool, and said tool holder has a flange assembly and a shank on an end thereof remote from said tips, said flange assembly having a V-groove and a large-diameter flange, said large-diameter flange having an outside diameter greater than the outside diameter of a flange of said rotating tool.

7. A multi-axis turning center according to claim 6, wherein said flange assembly has at least one key slot, said spindle head having an end which supports a key removably engageable in said key slot, said key being fixed to said end and extending radially of said spindle head; wherein said key engages in said key slot of said large-diameter flange only when said multi-point turning tool is mounted on said spindle; wherein when said rotating tool is mounted on said spindle, said key is disposed in a position spaced from said flange of said rotating tool so as not to obstruct rotating motion of said rotating tool; and wherein said multi-point turning tool mounted on said spindle is nonrotatably positioned and fixed to said end of said spindle head by a fixture, said fixture comprising said key and said key slot.

8. A multi-axis turning center according to claim 1, wherein said multi-point turning tool is translated over large strokes in the directions of two axes to index said tips.

9. A multi-axis turning center according to claim 1, wherein each of said positions represents a range in which said multi-point turning tool is movable while said workpiece is being turned thereby.

10. A multi-axis turning center according to claim 1, wherein said multi-point turning tool is translated to said positions fully around said workpiece.

11. A multi-axis turning center according to claim 1, wherein said multi-point turning tool is translated to said positions in a partial range around said workpiece.

12. A multi-axis turning center according to claim 1, wherein said multi-axis turning center is a five-axis-controlled vertical machining center in which said spindle has an axis directed substantially perpendicularly to a floor on which said multi-axis turning center is installed, said table for gripping and positioning said workpiece so as to be directed upwardly is disposed below the vertical position of said spindle head, and said table is swingable and also is at least rotatable.

13. A multi-axis turning center according to claim 1, wherein said multi-axis turning center is capable of performing a turning process on said workpiece by using said multi-point turning tool and a cutting process on said workpiece by using a rotating tool.

14. A multi-axis turning center according to claim 13, wherein said multi-axis turning center is capable of performing said turning process and said cutting process successively on said workpiece automatically, and wherein said workpiece is indexed vertically and horizontally and is also indexed obliquely as desired by a table swinging unit, accordingly, said multi-axis turning center performs a wide variety of turning and cutting processes on said workpiece.

15. A method of turning a workpiece with a multi-axis turning center having a spindle head, a spindle supported by said spindle head, a table or a headstock to grip and rotate a workpiece thereon, said table or said headstock being disposed in confronting relation to said spindle, said spindle head being relatively translatable in the three mutually transverse directions relative to said workpiece gripped and rotated by said table or said headstock, and a multi-point turning tool, mounted on said spindle and having a plurality of tips, to turn said workpiece gripped and supported by said table or said headstock, said method comprising the steps of:

moving said spindle head to translate said multi-point turning tool to one of plural positions around said workpiece, without said spindle head being rotated between the plural positions or when turning said workpiece with said tips, and turning said workpiece while said tips are selectively used depending on said one of the positions.

16. A method according to claim 15, wherein said multi-point turning tool is positioned and fixed to an end of said spindle head by a fixture, said fixture comprising a key and a key slot for receiving said key therein.

17. A method according to claim 16, further comprising the steps of: when said multi-point turning tool is translated to one of the positions around said workpiece, keeping said multi-point turning tool nonrotatably positioned and fixed to said end of said spindle head by said fixture, and holding the coordinates of a central position of said workpiece unchanged; and determining the coordinates of said spindle when said multi-point turning tool is located in one of the positions with respect to said workpiece, thereby judging that one of said tips is selected, and controlling movement of said spindle head.

18. A method according to claim 15, wherein said multi-axis turning center is a five-axis-controlled vertical machining center in which said spindle has an axis directed substantially perpendicularly to a floor on which said multi-axis turning center is installed, said table for gripping and positioning said workpiece so as to be directed upwardly is disposed below the vertical position of said spindle head, and said table is swingable and also is at least rotatable, and wherein said workpiece is turned by said five-axis-controlled vertical machining center.

19. A multi-axis turning center according to claim 1, wherein said spindle is rotatably supported by said spindle head.

20. A method according to claim 15, wherein said spindle is rotatably supported by said spindle head.

* * * * *